United States Patent
Chana

(10) Patent No.: US 7,377,687 B2
(45) Date of Patent: May 27, 2008

(54) FLUID TEMPERATURE MEASUREMENT

(75) Inventor: Kamaljit Singh Chana, Farnborough (GB)

(73) Assignee: Qinetiq Limited (GB)

( * ) Notice: Subject to any disclaimer, the term of this patent is extended or adjusted under 35 U.S.C. 154(b) by 0 days.

(21) Appl. No.: 10/535,321

(22) PCT Filed: Nov. 17, 2003

(86) PCT No.: PCT/GB03/04959

§ 371 (c)(1),
(2), (4) Date: May 18, 2005

(87) PCT Pub. No.: WO2004/046672

PCT Pub. Date: Jun. 3, 2004

(65) Prior Publication Data
US 2005/0281312 A1 Dec. 22, 2005

(30) Foreign Application Priority Data
Nov. 19, 2002 (GB) .................. 0226861.3

(51) Int. Cl.
*G01K 3/00* (2006.01)
*G01K 7/00* (2006.01)
*G01K 13/00* (2006.01)

(52) U.S. Cl. .................. 374/110; 374/166; 374/148

(58) Field of Classification Search ................ 374/110, 374/148, 166
See application file for complete search history.

(56) References Cited
U.S. PATENT DOCUMENTS
2,585,959 A    2/1952   Minter
(Continued)

FOREIGN PATENT DOCUMENTS
EP    1 079 219    8/2000
(Continued)

OTHER PUBLICATIONS

Hogg et al. "Wide Bandwidth Stagnation Temperature Measurements in Vortical Flows Behind Turbine Vanes", IEEE, pp. 389-400 (1997).

(Continued)

*Primary Examiner*—Gail Verbitsky
*Assistant Examiner*—Mirellys Jagan
(74) *Attorney, Agent, or Firm*—McDonnell Boehnen Hulbert & Berghoff LLP

(57) ABSTRACT

A fluid temperature measurement probe, particularly for total temperature measurements in high temperature unsteady gas flows, such as in gas turbine engines. A pair of thin film resistance thermometers are deposited on the probe to sense its surface temperature at respective locations and the structure of the probe is configured such that the regions into which heat diffuses from the respective locations have different thermal products. In this way the thin film elements experience different heat transfer rates when exposed to the same fluid temperature. In one embodiment this is achieved by applying one of the elements to the surface of a solid rod of glass or ceramic and the other element to a portion which has been machined to leave an air pocket under a thin cylindrical wall of the rod material. In use the probe is exposed only temporarily to the high temperature fluid and withdrawn again before reaching its softening temperature. The total temperature $T_t$ of the fluid can be calculated from the expression $T_t = T_{w1} + q_1(T_{w2}-T_{w1})/(q_1-q_2)$, where $T_{w1}$ and $T_{w2}$ are the probe surface measured by the respective thin film elements and $q_1$ and $q_2$ are the respective heat transfer rates experienced thereby, the latter derived from the respective surface temperature histories.

27 Claims, 3 Drawing Sheets

U.S. PATENT DOCUMENTS

| | | | |
|---|---|---|---|
| 3,776,039 A | | 12/1973 | Bowen |
| 4,096,575 A | | 6/1978 | Itoh |
| 4,595,298 A | * | 6/1986 | Frederick .................... 374/144 |
| 4,654,624 A | * | 3/1987 | Hagan et al. ................. 338/34 |
| 5,718,512 A | * | 2/1998 | Ngo-Beelmann ........... 374/148 |
| 5,879,082 A | * | 3/1999 | Smitherman et al. ....... 374/110 |
| 6,367,970 B1 | | 4/2002 | Danielson |
| 6,432,287 B1 | * | 8/2002 | McMackin et al. ......... 204/424 |

FOREIGN PATENT DOCUMENTS

| | | |
|---|---|---|
| GB | 2 314 164 | 12/1997 |
| JP | 04105028 A * | 4/1992 |
| JP | 404105028 A | 4/1992 |

OTHER PUBLICATIONS

Mallison et al., "Gun Tunnel Flow Calibration: Defining Input Conditions for Hypersonic Flow Computations", Shock Waves, pp. 313-322 (2000).

George et al. "An Evaluation of Analog and Numerical Techniques for Unsteady Heat Transfer Measurement with Thin-Film Gauges in Transient Facilities", pp. 333-342 (1991).

* cited by examiner

FLUID TEMPERATURE MEASUREMENT

The present invention relates to a device and method for measuring the temperature of a fluid. It has particular application for total temperature measurement in high temperature unsteady gas flows, for example in gas turbine engines or similar high temperature environments.

Accurate temperature measurement within the aggressive environment of a gas turbine engine presents significant problems. Combustor exit temperatures typically reach around 2000° K and will rapidly-destroy any conventional form of instrumentation exposed to that environment. Thermocouples are used in many applications to provide low cost measurement of high temperatures, but their time response is poor and restricts their usefulness for measurement within unsteady flows. Neither could they survive in a typical gas turbine combustor exit for long enough to provide reliable temperature measurements.

GB-A-2314164 describes an alternative form of device for such measurement comprising a probe with two thin film heat transfer gauges at its tip. Each gauge comprises a platinum element whose electrical resistance varies with temperature and is sensed through an associated circuit. Prior to exposure to the environment to be measured one of the gauges is preheated, by use of an external heater, a separate heating element incorporated in the probe, or by passing a specified current through the respective platinum element. In use the probe is rapidly inserted into and retracted from the environment and the fluid temperature is determined from the relationship:

$$T_t = T_{w1} + q_1(T_{w2} - T_{w1})/(q_1 - q_2)$$

where $T_t$ is the total temperature of the fluid being measured, $T_{w1}$ and $T_{w2}$ are the respective surface temperatures of the two gauge elements arising from exposure to the fluid (and consequent on their initial temperature difference) and $q_1$ and $q_2$ are the respective heat transfer rates experienced by the two gauge elements (which can be derived from their temperature histories). The requirement to preheat one of the elements adds undesirable complexity to the process, however. It also places a practical limitation on the temperatures which can be measured, as the initial differential is rapidly eliminated as the two elements are heated by the fluid.

The present invention therefore seeks to provide a means of temperature measurement for the kind of service indicated above which avoids the drawbacks of preheating as in GB-A-2314164.

In a first aspect the invention resides in a device for use in measuring the temperature of a fluid comprising a structure bearing two temperature sensitive elements adapted to be temporarily exposed to the fluid, wherein the structure provides respective regions for the diffusion of heat from the fluid through the respective said elements, the thermal products of said regions being selected such that, in use, said elements experience different heat transfer rates when exposed to the same fluid temperature.

In a second aspect the invention resides in a method of measuring the temperature of a fluid which comprises temporarily exposing to the fluid a device in accordance with the first aspect of the invention; monitoring the respective temperatures of the temperature sensitive elements of such device over a period; deriving from respective changes of temperature of said elements the respective heat transfer rates experienced thereby; and deriving the temperature of the fluid from a relationship of the temperatures of said elements and the derived heat transfer rates.

In a third aspect the invention resides in an apparatus for measuring the temperature of a fluid comprising a device according to the first aspect of the invention; means for monitoring the respective temperatures of the temperature sensitive elements of such device over a period; and computational means for deriving from respective changes of temperature of said elements the respective heat transfer rates experienced thereby and for deriving the temperature of the fluid from a relationship of the temperatures of said elements and the derived heat transfer rates.

In use of the present invention high fluid temperatures can be derived from measurements of the surface temperatures of the structure of the exposed device at the locations of the two temperature sensitive elements, together with the derived associated heat transfer rates, without the need for preheating one of the elements, since the nature of the structure itself will give rise to a differential between the two locations. In addition to simplifying the measurement process this removes the limit on measurable fluid temperatures inherent due to preheating in GB-A-2314164, the only practical limitation being the survivability of the materials used in the device.

These and other features of the invention will now be more particularly described, by way of example only, with reference to the accompanying drawings, in which.

Figure 1:
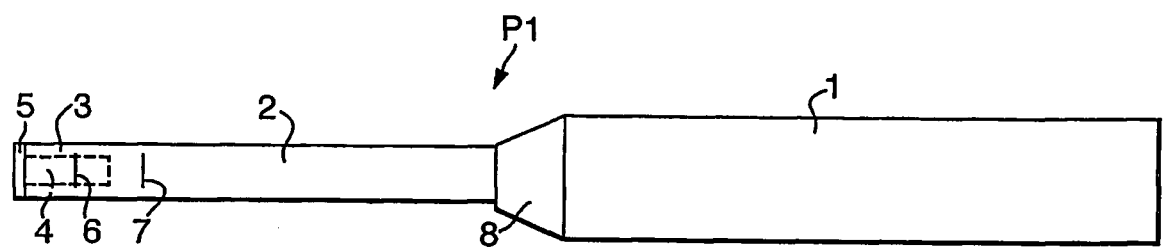
FIG. 1 is a side view of one preferred embodiment of a temperature measurement probe according to the invention.

FIG. 1 illustrates a probe P1 for temperature measurement in accordance with the invention. It comprises a hollow steel shaft 1 carrying a circular cross-section rod 2 of electrically insulative material, in this example a machinable glass known under the registered trade mark Macor (of Corning Incorporated). The distal end of the rod 2 is coaxially machined to leave a thin cylindrical wall 3 of Macor surrounding an air pocket 4, and is closed by a Macor end cap 5. In one example which has been tested as described below the diameter of the rod 2 is 4 mm and the wall thickness at 3 is 0.25 mm. Two substantially identical platinum thin film heat transfer elements (resistance thermometers) 6 and 7, typically about 1 m thick, are painted or sputtered in the circumferential direction onto the Macor surface near the end of the rod so that one of them (6) lies on the thin wall 3 while the other (7) lies on the full thickness of the rod 2. Electrical leads are connected to the ends of the respective elements 6 and 7 for the supply of a constant current to each. These leads are not shown in FIG. 1 but may comprise tracks of conductive ceramic paste painted onto the rod 2 and extending to a connector within a Macor collar 8 at the junction with the steel shaft 1, from where a conventional cable is taken through the shaft to an external power/monitoring circuit.

In use of the illustrated probe to measure the total temperature of a high temperature gas flow, such as within part of a gas turbine engine, it is temporarily inserted into the stream with the elements 6 and 7 facing the direction of flow (i.e. with the longitudinal axis of the probe transverse to the flow), and withdrawn again before the rod 2 reaches its softening temperature. The platinum elements 6 and 7 are powered by a respective supply of constant current and their temperatures over the period of exposure are measured by monitoring the resultant voltages across them.

The elements 6 and 7 are located close to the stagnation point of the cylindrical probe surface. Therefore the convective heat transfer between the flow and the probe is proportional to the temperature difference between the flow total temperature and the probe surface temperature, such that:

$$q_1 = h_1(T_t - T_{w1}) \text{ and}$$

$$q_2 = h_2(T_1 - T_{w2})$$

where $q_1$ and $q_2$ are the surface heat transfer rates (W/m$^2$) at the respective locations of the elements 6 and 7, $h_1$ and $h_2$ are the convective heat transfer coefficients (W/m$^2$K) at those locations, $T_t$ is the flow total or stagnation temperature and $T_{w1}$ and $T_{w2}$ are the probe wall temperatures at the respective locations. The convective heat transfer coefficient h is a property of the stagnation point boundary layer and is thus a function of the probe geometry and the upstream flow condition. Since it can be assumed that at the locations of the elements 6 and 7 two geometrically identical cylinders are exposed to the same flow then h1=h$_2$ and the foregoing equations can be resolved to:

$$T_t = T_{w1} + q_1 (T_2 - T_{w1})/(q_1 - q_2)$$

In use, as indicated above, the surface temperatures $T_{w1}$ and $T_{w2}$ are measured by monitoring the voltages across the respective thin film elements 6 and 7, which typically have a frequency response up to 100 KHz. $T_t$ can be calculated from the above relationship for successive instants during the period of exposure, in an associated computer, at intervals selected with regard to the frequency response of the thin films and the nature of the flow concerned—typically at 10 ms intervals for gas turbine flow investigations. For this purpose the convective heat fluxes $q_1$ and $q_2$ at each instant are derived from the thin film temperature histories during the period of exposure up to that instant using a transient one-dimensional heat diffusion process which models the transient heat diffusion within the probe structure underlying the respective elements, as will be more fully explained hereafter.

Clearly, measurement of $T_t$ by this method requires the establishment of different q values at the two $T_w$ locations, which in the illustrated probe is achieved by the presence of different materials in the regions of the probe structure into which the heat diffuses from those locations—in the case of element 7 solid Macor and in the case of element 6 a thin wall of Macor followed by air. In the probe design the important parameter is the thermal product $\sqrt{\rho c k}$ of the materials used, where p is density, c is specific heat capacity and k is conductivity. The $\sqrt{\rho c k}$ of Macor is 1615 J/m$^2$Ks$^{1/2}$ whereas for air it is 5.5J/m$^2$Ks$^{1/2}$. Upon initial exposure of the probe to the high temperature fluid the temperature response of both elements 6 and 7 will be the same as both are present on a Macor substrate. However, after a short period given by t=x$^2$/α where x is the thickness of the wall 3 and α=k/ρc—and typically 10 ms for a Macor wall thickness of 0.25 mm—the element 6 will experience a thermal response related to the air in pocket 4. This results in a higher surface temperature and a lower heat transfer rate than for the element 7. As the surface temperatures increase with time the heat transfer rates reduce, since the heat transfer rate is dependent on the temperature difference between the flow and the probe surface.

Turning now to the determination of the surface heat fluxes, it is known that for a film on a flat plate the following semi-infinite flat plate heat conduction equation can be used:

$$\frac{\partial^2 T}{\partial x^2} = \frac{1}{\alpha} \frac{\partial T}{\partial t}$$

where T is the temperature, x is the distance measured from the surface, t is the time and α=k/ρc, with the following boundary conditions applied:

$T(\infty,t)=T_I$, initial temperature of substrate $T(0,t)=T_s(t)$, measured surface temperature history.

This heat conduction equation can be solved for surface heat transfer rate using either electric analogue circuits or numerically. Methods commonly used include Numerical Integration (Schultz and Jones, 1973), Discrete Fourier Transform (Moss and Ainsworth 1993), and the Impulse Response Method of Oldfield (2000).

However, in the case of the illustrated probe the thin films 6 and 7 are mounted on a cylindrical surface. For heat transfer gauges on geometries where the surface curvature is comparable to the heat penetration depth during the operation time, allowance has to be made for the curvature effect. This can either be based on correction factors for a flat plate solution or radius variation has to be included in the one-dimensional heat conduction equation. Correction methods only perform well for short time periods of run time and low heat transfer rates. Furthermore, in the illustrated probe significant variations are found in the substrate thermal properties. To take account of these variations they have to be Incorporated in the one-dimensional heat conduction equation. The methods for solving the heat conduction equation given above do not allow for the radius and thermal property variation to be taken into account. They are developed specifically for flat plate solutions with fixed substrate properties.

We have therefore derived the following heat conduction equation for both radius of curvature and thermal property variation:

$$\frac{\partial}{\partial r}\left[k(T)\frac{\partial T}{\partial r}\right] + k(T)\frac{\partial}{r}\frac{\partial T}{\partial r} = \rho c(T)\frac{\partial T}{\partial t}$$

where r is the radius within the substrate, p the density, k conductivity and c specific heat capacity, with boundary conditions:

$$\left[\frac{\partial T}{\partial r}\right]_{(0,t)} = 0,$$

i.e. symmetry applies at the centre of the substrate $T(R,t)=Ts(t)$, measured surface temperature history where R is the radius at the surface of the probe.

The symmetry boundary condition does not restrict the heat transfer solution to be obtained once the heat penetration has reached the centre of the substrate. In practice the solution is limited by the time taken for two and threedimensional effects to become significant. These are associated with the physical construction of the probe body. Various methods can be used to solve this heat conduction equation for ∂T/∂t (which gives q), the preferred method being based on a finite difference scheme. To achieve this the probe is meshed from the centre to the surface with nodes in the radial direction. The spacial temperature within the probe body is derived in time using the measured surface temperature. The thermal properties are evaluated at each time step for the previously evaluated temporal temperature. Since the solution requires the inversion of a matrix, it is desirable to minimise the number of nodes within the probe to reduce analysis time. Hence, grid refinement is employed at the surface of the probe where the temperature gradients will be the largest The grid refinement also takes into account the diameter of the probe. In addition this method allows the use of multi-layered substrates. For this case the appropriate thermal properties are calculated for each layer as the solution progresses though the probe substrates. The grid refinement in this case is optimised for both the substrate materials. The substrates are not restricted to solids, they may include gases or gas mixtures (such as the air pocket 4) so long as their thermal properties are known, or even a vacuum.

Figure 2:
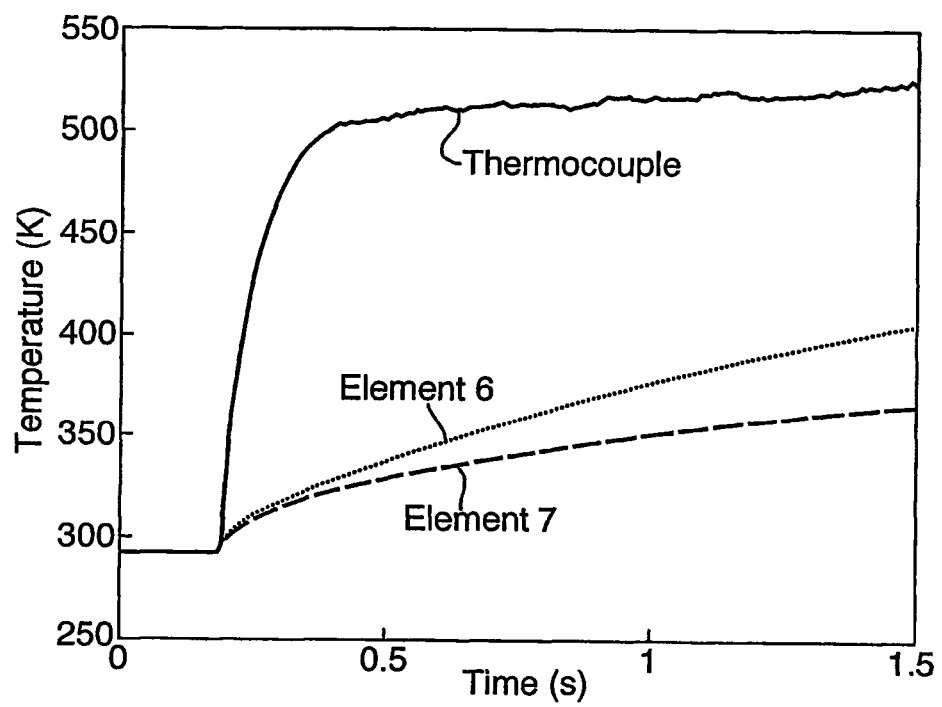
FIG. 2 is a graph of surface temperatures on a probe as illustrated in FIG. 1 as measured under test conditions, together with the fluid temperature as measured by a separate thermocouple.
Figure 3:
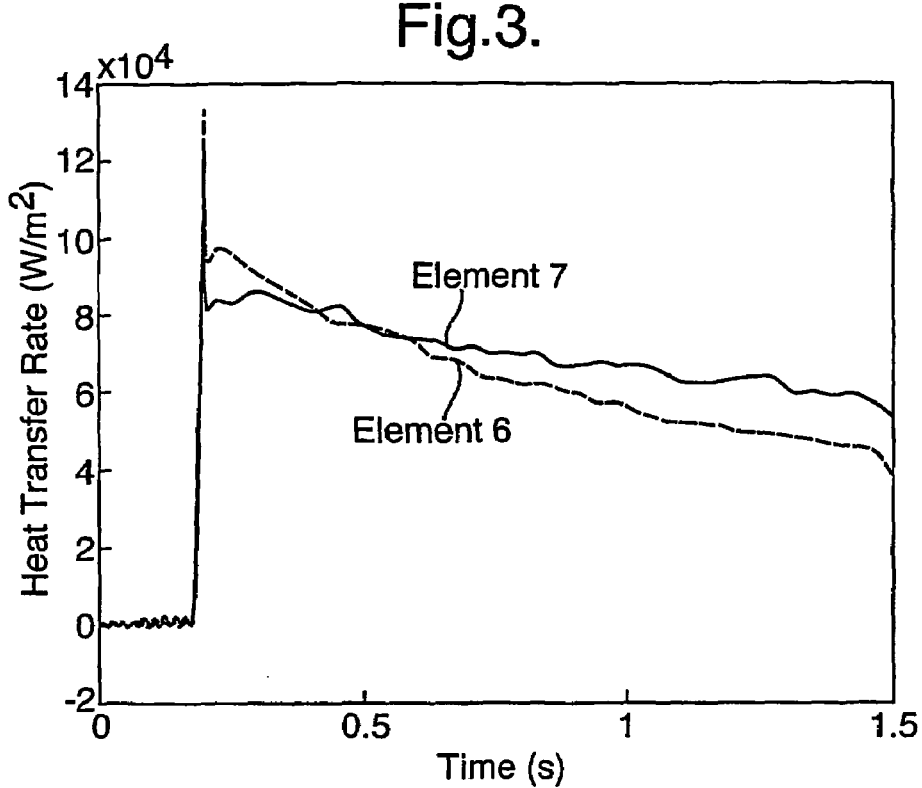
FIG. 3 is a graph of heat transfer rates as derived from the probe surface temperature measurements illustrated in FIG. 2.
Figure 4:
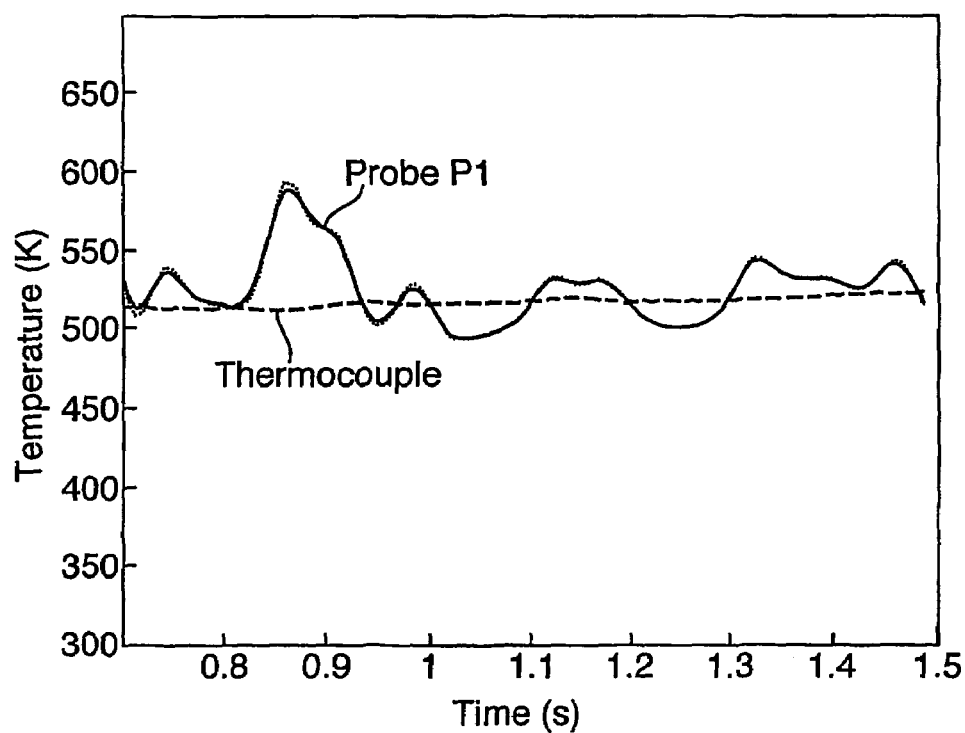
FIG. 4 is a graph of flow total temperature as derived from the probe surface temperature measurements illustrated in FIG. 2, and as measured by the thermocouple.

FIGS. 2 to 4 show test results for a probe P1 substantially as described with reference to FIG. 1 which has been exposed substantially instantaneously to a fluctuating gas jet between about 500 and 600° K. FIG. 2 shows the probe surface temperature rise as measured by the elements 6 and 7 and a trace from a fast response thermocouple placed adjacent to the probe in the same jet. FIG. 3 shows the calculated heat transfer rate, from the surface temperature history, plotted against time for each element 6,7. FIG. 4 shows the evaluated flow total temperature from the thin film measurements of the FIG. 1 probe and the total temperature as measured by the thermocouple. Note that the fluctuations on the probe trace are real as the jet used in the test was fluctuating. The thermocouple does not, however, have sufficient frequency response to capture the fluctuations.

The illustrated probe measures the flow total temperature irrespective of the flow Mach number because stagnation enthalpy is conserved as the flow decelerates to the stagnation point and there is virtually no viscous dissipation in the stagnation point boundary layer. Indeed, even in flows where an immersed body would eventually reach a recovery temperature slightly lower than the flow total temperature, the probe accurately measures the total temperature. This is because the thin films 6 and 7 measure the transient heat flux close to the stagnation point, which is driven by the flow total temperature.

In a variant of the probe P1 the rod 2 is made from a refractory ceramic, such as alumina, having a substantially higher melting point than Macor, and hence capable of use in higher temperature flows and/or over a longer exposure time. Another candidate material is quartz.

Figure 5:
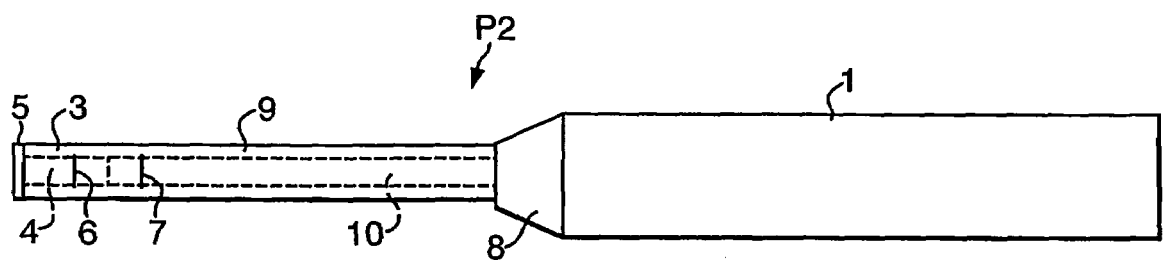
FIGS. 5 and 6 are side views of two further embodiments of a temperature measurement probe according to the invention.
Figure 6:
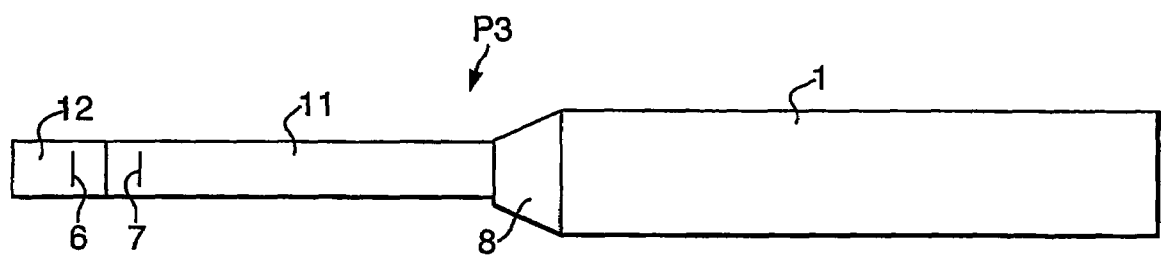

FIGS. 5 and 6 illustrate alternative probe constructions P2 and P3, with like reference numerals denoting like parts with FIG. 1. In FIG. 5 the rod 2 is replaced with a tube 9 of Macor, ceramic or quartz surrounding a metal rod 10 over most of its length but still leaving an air pocket 4 at its distal end. The rod 10 has a significantly higher thermal product than the tube 9. In this case the thin film element 7 lies on a portion of the tube 9 overlying the rod 10, which increases the heat transfer rate into the structure and leads to a greater temperature differential between the two thin films than in the FIG. 1 embodiment. The rod 10 also enhances the physical strength of the probe. In FIG. 6 the rod 2 is replaced with a solid rod composed of two axial sections 11 and 12 made of respective materials with different thermal products (e.g. Macor and ceramic or quartz and ceramic), and one of the thin film elements 6,7 is applied to each section.

Although in each embodiment described above the thin film elements 6,7 are shown deposited on the respective substrate in its circumferential direction, they could alternatively be deposited in the longitudinal direction.

The invention claimed is:

1. Apparatus for measuring the temperature of a flowing fluid comprising; a device comprising a structure bearing two adjacent temperature sensitive elements adapted to be temporarily exposed to substantially the same fluid flow conditions in use of the device and without means for substantially preheating one of said elements relative to the other, wherein the structure provides respective regions for the diffusion of heat between the fluid and the structure through the respective said elements, and the thermal products within said regions differ such that, in use, said elements experience different heat transfer rates due to such diffusion when exposed to the same fluid temperature; means for monitoring the respective temperatures of said elements over a period; and computational means to derive from respective changes of temperature of said elements the respective heat transfer rates experienced thereby and to derive the temperature of the fluid from a relationship of the temperatures of said elements and the derived heat transfer rates.

2. Apparatus according to claim 1 wherein said temperature sensitive elements are thin film resistance thermometers.

3. Apparatus according to claim 1 wherein said computational means are adapted to derive the temperature of the fluid using the relationship:

$$T_1 = T_{w1} + q_1(T_{w2} - T_{w1})/(q_1 - q_2)$$

where $T_1$ is the temperature of the fluid, $T_{w1}$ and $T_{w2}$ are the respective temperatures of the temperature sensitive elements and $q_1$ and $q_2$ are the respective heat transfer rates experienced by the temperature sensitive elements.

4. Apparatus according to claim 1 wherein the temperature sensitive elements are borne on a curved surface of the structure and said computational means are adapted to derive the respective heat transfer rates using the relationship:

$$\frac{\partial}{\partial r}\left[k(T)\frac{\partial T}{\partial r}\right] + k(T)\frac{\partial}{r}\frac{\partial T}{\partial r} = \rho c(T)\frac{\partial T}{\partial t}$$

where T is temperature, t is time, r is radius, ρ p is density, k is conductivity and c is specific heat capacity, within the respective region within the structure.

5. Apparatus according to claim 1 wherein said structure is elongate and adapted to be exposed to the fluid with its longitudinal axis transverse to the flow, said temperature sensitive elements being borne on a lateral surface of said structure such that, in use, said elements can face the direction of flow.

6. Apparatus according to claim 1 wherein said structure comprises a tubular member of a first material surrounding a member of a second material over part of its length and surrounding a cavity over another part of its length, the second material having a higher thermal product than the first material, a first of the temperature sensitive elements being borne on part of the surface of the said tubular member which overlies said cavity and the second of the temperature sensitive elements being borne on part of the surface of said tubular member which overlies said member of second material.

7. Apparatus according to claim 6 wherein said first material is a glass, ceramic or quartz and said second material is a metal.

8. Apparatus according to claim 1 wherein said structure comprises a member composed of first and second materials having first and second thermal products at first and second locations respectively, a first of the temperature sensitive elements being borne on part of the surface of said member at said first location and the second of the temperature sensitive elements being borne on part of the surface of said member at said second location.

9. Apparatus according to claim 8 wherein said first material is a glass or quartz and said second material is a ceramic.

10. Apparatus according to claim 1 wherein said structure comprises a member of a selected material the thickness of which differs in the respective said regions.

11. Apparatus according to claim 10 wherein said material is a glass, ceramic or quartz.

12. Apparatus according to claim 10 wherein said structure comprises a member having an internal cavity at a selected location, a first of the temperature sensitive elements being borne on part of the surface of said member which overlies said cavity and the second of the temperature sensitive elements being borne on part of the surface of said member which does not overly said cavity.

13. Apparatus according to claim 12 wherein said cavity contains a gas, gas mixture or vacuum.

14. A method of measuring the temperature of a flowing fluid which comprises temporarily exposing to the fluid a device comprising a structure bearing two adjacent temperature sensitive elements such that said elements are exposed to substantially the same fluid flow conditions, without substantially preheating one of said elements relative to the other, said structure providing respective regions for the diffusion of heat between the fluid and the structure through the respective said elements and the thermal products within said regions differ such that said elements experience different heat transfer rates due to such diffusion when exposed to the same fluid temperature; monitoring the respective temperatures of the temperature sensitive elements of such device over a period; deriving from respective changes of temperature of said elements the respective heat transfer rates experienced thereby; and deriving the temperature of the fluid from a relationship of the temperatures of said elements and the derived heat transfer rates.

15. A method according to claim 14 wherein the temperature of the fluid is derived using the relationship:

$$T_t = T_{w1} + q_1(T_{w2} - T_{w1})/(q_1 - q_2)$$

where $T_t$ is the temperature of the fluid, $T_{w1}$ and $T_{w2}$ are the respective temperatures of the temperature sensitive elements and p and $q_2$ are the respective heat transfer rates experienced by the temperature sensitive elements.

16. A method according to claim 14 wherein the temperature sensitive elements are borne on a curved surface of the structure and the respective heat transfer rates are derived using the relationship:

$$\frac{\partial}{\partial r}\left[k(T)\frac{\partial T}{\partial r}\right] + k(T)\frac{\partial}{r}\frac{\partial T}{\partial r} = \rho c(T)\frac{\partial T}{\partial t}$$

where T is temperature, t is time, r is radius, ρ is density, k is conductivity and c is specific heat capacity, within the respective region within the structure.

17. A method according to claim 14 for measuring the flow temperature within a gas turbine engine following combustion.

18. A device for use in measuring the temperature of a fluid comprising a structure bearing two temperature sensitive elements adapted to be temporarily exposed to the fluid, wherein the structure provides respective regions for the diffusion of heat from the fluid through the respective said elements, the thermal products within said regions being selected such that, in use, said elements experience different heat transfer rates when exposed to the same fluid temperature; said structure comprising a tubular member of a first material surrounding a member of a second material over part of its length and surrounding a cavity over another part of its length, the second material having a higher thermal product than the first material, a first of the temperature sensitive elements being borne on part of the surface of the said tubular member which overlies said cavity and the second of the temperature sensitive elements being borne on part of the surface of said tubular member which overlies said member of second material.

19. A device according to claim 18 wherein said first material is a glass, ceramic or quartz and said second material is a metal.

20. A device for use in measuring the temperature of a flowing fluid comprising an elongate structure adapted to be temporarily exposed to the fluid with its longitudinal axis transverse to the flow; the structure bearing two temperature sensitive elements on a curved lateral surface thereof such that, in use, said elements can face the direction of flow; the structure providing respective regions for the diffusion of heat from the fluid through the respective said elements, the thermal products within which regions differ such that, in use, said elements experience different heat transfer rates when exposed to the same fluid temperature; and without means for substantially preheating one of said elements relative to the other.

21. A device according to claim 20 wherein said structure comprises a member of a selected material the thickness of which differs in the respective said regions.

22. A method of measuring the temperature of a fluid which comprises temporarily exposing to the fluid a device comprising a structure bearing two temperature sensitive elements and providing respective regions for the diffusion of heat from the fluid through the respective said elements, the thermal products within said regions being selected such that said elements experience different heat transfer rates when exposed to the same fluid temperature; monitoring the respective temperatures of the temperature sensitive elements of such device over a period; deriving from respective changes of temperature of said elements the respective heat transfer rates experienced thereby; and deriving the temperature of the fluid from a relationship of the temperatures of said elements and the derived heat transfer rates; wherein the temperature sensitive elements are borne on a curved surface of the structure and the respective heat transfer rates are derived using the relationship:

$$\partial/\partial r[k(T)\partial T/\partial r] + k(T)\partial/r/\partial T/\partial r = \rho c(T)\partial T/\partial t$$

where T is temperature, t is time, r is radius, $\rho$ is density, k is conductivity and c is specific heat capacity, within the respective region within the structure.

23. Apparatus for measuring the temperature of a fluid comprising: a device comprising a structure bearing two temperature sensitive elements adapted to be temporarily exposed to the fluid, wherein the structure provides respective regions for the diffusion of heat from the fluid through the respective said elements, the thermal products within said regions being selected such that, in use, said elements experience different heat transfer rates when exposed to the same fluid temperature; means for monitoring the respective temperatures of the temperature sensitive elements of such device over a period; and computational means for deriving from respective changes of temperature of said elements the respective heat transfer rates experienced thereby and for deriving the temperature of the fluid from a relationship of the temperatures of said elements and the derived heat transfer rates; wherein the temperature sensitive elements are borne on a curved surface of the structure and said computational means are adapted to derive the respective heat transfer rates using the relationship:

$$\partial/\partial r[k(T)\partial T/\partial r]+k(T)\partial/r/\partial T/\partial r=\rho c(T)\partial T/\partial t$$

where T is temperature, t is time, r is radius, $\rho$ is density, k is conductivity and c is specific heat capacity, within the respective region within the structure.

24. Apparatus for measuring the temperature of a flowing fluid comprising; a device comprising a structure bearing two temperature sensitive elements adapted to be temporarily exposed to the fluid and without means for substantially preheating one of said elements relative to the other, wherein the structure provides respective regions for the diffusion of heat between the fluid and the structure through the respective said elements, and the thermal products within said regions differ such that, in use, said elements experience different heat transfer rates when exposed to the same fluid temperature; means for monitoring the respective temperatures of said elements over a period; and computational means to derive from respective changes of temperature of said elements the respective heat transfer rates experienced thereby and to derive the temperature of the fluid from a relationship of the temperatures of said elements and the derived heat transfer rates; wherein said structure comprises a member having an internal cavity at a selected location, a first of the temperature sensitive elements being borne on part of the surface of said member which overlies said cavity and the second of the temperature sensitive elements being borne on part of the surface of said member which does not overly said cavity.

25. Apparatus for measuring the temperature of a flowing fluid comprising; a device comprising a structure bearing two temperature sensitive elements adapted to be temporarily exposed to the fluid and without means for substantially preheating one of said elements relative to the other, wherein the structure provides respective regions for the diffusion of heat between the fluid and the structure through the respective said elements, and the thermal products within said regions differ such that, in use, said elements experience different heat transfer rates when exposed to the same fluid temperature; means for monitoring the respective temperatures of said elements over a period; and computational means to derive from respective changes of temperature of said elements the respective heat transfer rates experienced thereby and to derive the temperature of the fluid from a relationship of the temperatures of said elements and the derived heat transfer rates; wherein said structure comprises a member composed of first and second materials having first and second thermal products at first and second locations respectively, a first of the temperature sensitive elements being borne on part of the surface of said member at said first location and the second of the temperature sensitive elements being borne on part of the surface of said member at said second location.

26. A method of measuring the temperature of a flowing fluid which comprises temporarily exposing to the fluid a device comprising a structure bearing two temperature sensitive elements, without substantially preheating one of said elements relative to the other, said structure providing respective regions for the diffusion of heat between the fluid and the structure through the respective said elements, and the thermal products within said regions differ such that said elements experience different heat transfer rates when exposed to the same fluid temperature; monitoring the respective temperatures of the temperature sensitive elements of such device over a period; deriving from respective changes of temperature of said elements the respective heat transfer rates experienced thereby; and deriving the temperature of the fluid using the relationship:

$$T_t = T_{w1} + q_1(T_{w2} - T_{w1})/(q_1 - q_2)$$

where $T_t$ is the temperature of the fluid, $T_{w1}$ and $T_{w2}$ are the respective temperatures of the temperature sensitive elements and $q_1$ and $q_2$ are the respective heat transfer rates experienced by the temperature sensitive elements.

27. Apparatus for measuring the temperature of a flowing fluid comprising; a device comprising a structure bearing two temperature sensitive elements adapted to be temporarily exposed to the fluid and without means for substantially preheating one of said elements relative to the other, wherein the structure provides respective regions for the diffusion of heat between the fluid and the structure through the respective said elements, and the thermal products within said regions differ such that, in use, said elements experience different heat transfer rates when exposed to the same fluid temperature; means for monitoring the respective temperatures of said elements over a period; and computational means to derive from respective changes of temperature of said elements the respective heat transfer rates experienced thereby and to derive the temperature of the fluid using the relationship:

$$T_t = T_{w1} + q_1(T_{w2} - T_{w1})/(q_1 - q_2)$$

where $T_t$ is the temperature of the fluid, $T_{w1}$ and $T_{w2}$ are the respective temperatures of the temperature sensitive elements and $q_1$ and $q_2$ are the respective heat transfer rates experienced by the temperature sensitive elements.

* * * * *